(12) United States Patent
Scheer

(10) Patent No.: US 7,927,532 B2
(45) Date of Patent: *Apr. 19, 2011

(54) BIODEGRADABLE NANO-POLYMER COMPOSITIONS AND BIODEGRADABLE ARTICLES MADE THEREOF

(75) Inventor: Frederic Scheer, Hawthorne, CA (US)

(73) Assignee: Cereplast, Inc., El Segundo, CA (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/365,579

(22) Filed: Feb. 28, 2006

(65) Prior Publication Data

US 2007/0203283 A1 Aug. 30, 2007

(51) Int. Cl.
*C08L 67/04* (2006.01)
*C08K 5/10* (2006.01)
*C08K 5/29* (2006.01)

(52) U.S. Cl. ............ 264/176.1; 264/177.2; 524/442; 524/449; 524/451; 524/493

(58) Field of Classification Search ............ 264/176.1, 264/177.2; 524/442, 449, 451, 493
See application file for complete search history.

(56) References Cited

U.S. PATENT DOCUMENTS

| 2,012,267 | A | 8/1935 | Carothers |
| 6,020,393 | A | 2/2000 | Khemani |
| 6,136,905 | A | 10/2000 | Suzuki et al. |
| 7,138,439 | B2 * | 11/2006 | Scheer et al. ............ 523/100 |
| 7,393,590 | B2 * | 7/2008 | Scheer et al. ............ 428/480 |
| 2005/0043462 | A1 | 2/2005 | Yamada et al. |
| 2005/0192377 | A1 | 9/2005 | Scheer et al. |

FOREIGN PATENT DOCUMENTS

| EP | 1 561 785 | | 8/2005 |
| JP | 2004323623 | * | 11/2004 |
| JP | 2005 323637 | | 11/2005 |
| WO | 02/059201 | | 8/2002 |
| WO | 03/066704 | | 8/2003 |

* cited by examiner

*Primary Examiner* — Ana L Woodward
(74) *Attorney, Agent, or Firm* — Wolf, Greenfield & Sacks, P.C.

(57) ABSTRACT

The invention relates to biodegradable nano-polymer compositions, or nanocomposites, comprising poly(lactic acid) and co-polyester polymer with adipic acid compounded with nanoparticles of a mineral material having a degree of purity of at least 99.9%, preferably 99.99%, selected from the group of silica and magnesium silicate. In addition, the present invention refers to a process for manufacturing the said compositions as well as biodegradable articles made on the basis of such compositions, such as molded, formed and extruded articles.

13 Claims, No Drawings

US 7,927,532 B2

BIODEGRADABLE NANO-POLYMER COMPOSITIONS AND BIODEGRADABLE ARTICLES MADE THEREOF

FIELD

The present invention relates to biodegradable polymer nanocomposites comprising poly(lactic acid) compounded with nanoparticles of an extremely pure mineral, silica based material. The invention further refers to a process for manufacturing said nanocomposites or, in other words biodegradable nano-polymer compositions, and to biodegradable articles made on the basis of said compositions as well.

BACKGROUND

Packaging material and disposable beakers, cups and cutlery are used nowadays widely and allow that food material may be sold and/or consumed under hygienic conditions. Such disposable materials and objects are highly estimated by the consumers and the retailers, since they may be simply disposed after use and do not have to be washed and cleaned like conventional dishes, glasses or cutlery.

Yet, the widespread and even growing use of such materials result in a mounting amount of litter produced each day. Currently, the plastic waste is either provided to garbage incinerators or accumulates in refuse dumps, with both of the above-mentioned solutions for waste disposal being associated with problems for the environment.

Thus, there is a need in the art to obviate the above problem and to provide materials, which combine the advantages of currently used plastics material and do not add to environmental pollution.

For preparing the above mentioned items several biodegradable polymers are already known in the state of the art and comprise materials on the basis of e.g. poly(glycolic acid), poly(epsilon-caprolactone), poly(lactic acid), and polydioxanone. The production of these polymers is, however, rather cumbersome and expensive, so that the use thereof is presently mainly restricted to high value medical applications requiring bioabsorbable materials. A few biodegradable resins have been used in applications such as described above but cost has made them un-affordable by the consumers.

An object of the present invention is thus to provide a biodegradable articles or items comprising a polymer composition, which composition is degraded in a natural environment in a time period which is significantly shorter as compared to the time period required for the degradation of conventional plastic materials, such as e.g. polyethylene. In a controlled environment such as a composting site the composition will allow biodegradation in period of time not to exceed 180 days, one of the time requirements set by the US specification set by ASTM (ASTM 6400 D99). Moreover, such a composition should also enable production of bags, bottles or cutlery, exhibiting desired properties for the respective purpose.

Another object of the invention is to provide biodegradable compositions which exhibit increased mechanical and/or thermal performance as compared to the current ones, e.g. thermal stability or thermal resistance, improved processability or flexibility.

Nanocomposites are rapidly expanding new plastic technology, offering promise for enabling novel polymer material. It appears that the "nano effect" allows certain polymers or polymer compositions such as biobased or biodegradable polymer compositions to bridge the gap with the use of conventional petroleum based plastics, allowing such novel material to achieve physical properties that open the uses of these novel materials in significantly broader technical or commercial applications.

The incorporation into such plastics of nano-sized fillers, whether they are minerals or organic fibers, creates foundation of polymer nanocomposites. The benefits of nanocomposites extend well beyond one or two improvements but translate into several improvements of physical and thermal properties of polymers at such degree that the starting core polymer matrix composition is modified into new shapes or structures, which allow eventually the creation of completely novel material or features.

The physical and thermal properties of the new polymer nanocomposites are so altered as compared to standard polymer material that the inventor retains that there is creation of a brand new material to be called "biodegradable nano-polymer composition".

These and other objects which will become apparent from the subsequent detailed description of the present invention, which provides among others a composition comprising between about 40 and 97% by weight of poly(lactic acid) polymer, between about 0.5 and 35% by weight of co-polyester polymer with adipic acid, and up to about 6% of nanoparticles of an extremely pure mineral material, in particular a mineral material having a degree of purity of at least 99.9%, selected from the group of silica and magnesium silicate, each on the basis of the total weight of the biodegradable polymer composition.

SUMMARY

A composition of the present invention is biodegradable when exposed to specific environmental conditions, such as composting, which will result in a loss of some properties that may be measured by standard methods appropriate to the plastic and in the application in a period of time that determines its classification. For instance composting is a managed process that controls the biological decomposition and transformation of biodegradable materials into humus-like substance called compost: the aerobic mesophilic and thermophilic degradation of organic matter to make compost; the transformation of biologically decomposable material through a controlled process of biooxidation that proceed through mesophilic and thermophilic phases and results in the production of carbon dioxide, water, minerals, and stabilized organic matter (compost or humus) (ASTM Terminology) Consequently all main components, poly(lactic acid) and co-polyester polymer with adipic acid will be degraded to small organic fragments which will create stabilized organic matter and will not introduce any hazard or heavy metals into soil.

As a result, objects made from the composition of the present invention will not contribute to a further increase of refuse dumps; on the contrary will allow creation of organic fertilizers such as compost, while such objects simultaneously provide all advantages of disposable objects highly estimated by the consumers and producer. Objects made of a composition according to the present invention may be disposed after use, are essentially of lightweight, and have not to be transported to a location where they have to be cleaned. In particular, objects made from a composition according to the present invention provide the advantage that objects thrown away in parks or at the beach will degrade and will vanish after some time. However this invention should not be publicize as a license to litter the environment.

Moreover, a composition according to the present invention may be produced completely or partially from renewable sources, when desired. In addition, a composition according to the present invention may be adapted to various processing methods known in the art.

Biodegradable polymers such as polylactides (PLAs) have been produced for many years. PLA resemble clear polystyrene and have good gloss and clarity for aesthetic appeal, along with physical properties well suited for use as fibers, films, and thermoformed packaging. PLA is also biocompatible and have been used extensively in medical and surgical applications, i.e. sutures and drug delivery devices. Unfortunately, PLA present major weaknesses such as brittleness as well as low thermal resistance, 136° F. (58° Celsius) and moisture-related degradation, limiting a lot of commercial applications.

Unexpectedly, the compositions according to the present invention provide physical properties which are not inherent to poly(lactic acid) and provide significant improvements with respect to the processability, production costs or heat resistance along with improved flexibility and ductility without decreasing their biodegradability.

It is assumed that the combination of a blending step performed at ambient temperature followed by extrusion at relatively high temperature and pressure through e.g. a twin screw extruder allow the creation of a brand new shape, structure or morphology of the polymer. Extrusion of the blended polymer mass compounded with the selected mineral nanoparticles at a high temperature induces shear forces which promote an exfoliation and dispersion of the components: as a result of it, the new polymer composition is constructed by evenly dispersing the selected mineral material into nanoparticles that form platelets.

The dispersion of the platelets is critical to make the compositions improved and the inventor has especially worked on avoiding the creation of aggregate of platelets, which would prevent the improvement in the properties herein described.

Such a performance has been achieved according to the present invention by making use for mixing the mineral nanoparticles of a custom designed side feeder, e.g. a tower to enter the barrel of the extruder; while doing so the inventor avoid direct injection of the nanoparticles to the molten polymer material and so allows the necessary good and smooth distribution of the said platelets during mixing and extrusion. As a result of it, these platelets are evenly distributed throughout the polymer matrix to create multiple parallel layers typical of the new polymer morphology mentioned here above.

It has been further noted that not only the size, namely the average size of the nanoparticles is important, but that the degree of purity of the selected mineral material is crucial to achieve the desired new features: a degree of purity of at least 99.9%, preferably of at least 99.99% is necessary for that.

The new shape, structure or morphology which characterizes the nano-polymer composition of the invention is tremendously and surprisingly improving the physical properties of the composition, namely its thermal properties and thermal stability: e.g., such compositions exhibit a significant improvement in terms of thermal resistance, of the magnitude of 35 to 45° F. (about 1.7 to 7.2° C.) depending on specific formulations.

Additional features and advantages are described herein, and will be apparent from, the following Detailed Description.

DETAILED DESCRIPTION

The present invention relates to a biodegradable plastic. The term "biodegradable plastic" pertains to a degradable plastic in which the degradation results from the action of naturally occurring microorganisms such as bacteria, fungi, and algae. A degradable plastic is a plastic designed to undergo a significant change in its chemical structure under specific environmental conditions, resulting in a loss of some properties that may be measured by standard tests methods appropriate to the plastic and the application in a period of time that determines its classification. Depending on the additional components present in the composition and the dimensions of the object made from said biodegradable material, the time period required for degradation will vary and may also be controlled when desired. Generally, the time span for biodegradation will be significantly shorter than the time span required for a degradation of objects made from conventional plastic materials having the same dimensions, such as e.g. polyethylene, which have been designed to last for as long as possible. For example, cellulose and Kraft paper is to biodegrade within 83 days in a compost environment. Our formulation is to biodegrade in a shorter period of time and will pass the tests required by ASTM 6400 D99, which demand that compostable plastic would biodegrade within less than 180 days. Articles made from PE would not degrade under normal composting conditions and PLA-based article would degrade in compost environment in weeks (about 6 to 8 weeks).

Biodegradable polymers are comprised of components which are reduced in film or fiber strength by microbial catalyzed degradation. The biodegradable polymers are reduced to monomers or short chains, which are then assimilated by the microbes. In an aerobic environment, these monomers or short chains are ultimately oxidized to $CO_2$, $H_2O$, and new cell biomass. In an anaerobic environment the monomers or short chains are ultimately oxidized to $CO_2$, $H_2O$, acetate, methane, and cell biomass. Successful biodegradation requires direct physical contact between the biodegradable polymers and the active microbial population or the enzymes produced by the active microbial population. Moreover, certain minimal physical and chemical requirements such as suitable pH, temperature, oxygen concentration, proper nutrients, and moisture level must be met. (cf. U.S. Pat. No. 6,020,393)

A biodegradable composition according to the present invention comprises between about 40% by weight to 97% by weight of poly(lactic acid) polymer, between about 0.5% by weight to 35% by weight of co-polyester polymer with adipic acid, and up to about 6% of nanoparticles of an extremely pure mineral material selected from the group of silica and magnesium silicate, each on the basis of the total weight of the biodegradable composition.

A composition according to the present invention may be obtained by mixing or blending the respective constituents in the desired amounts. This may be performed according to any method known in by the skilled artisan. For example, poly (lactic acid) polymer and co-polyester polymer with adipic acid may be mixed in pure form, for example blended by means of mill roll blending, and heated to a temperature chosen according to the general knowledge in the art such that at least one of the above-mentioned components is partially or essentially completely molten.

Poly(lactic acid) may be represented by the following structure:

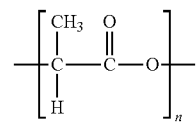

wherein n for example can be an integer between 10 and 250. Poly(lactic acid) can be prepared according to any method known in the state of the art. For example, poly(lactic acid) can be prepared from lactic acid and/or from one or more of D-lactide (i.e. a dilactone, or a cyclic dimer of D-lactic acid), L-lactide (i.e. a dilactone, or a cyclic dimer of L-lactic acid), meso D,L-lactide (i.e. a cyclic dimer of D-, and L-lactic acid), and racemic D,L-lactide (racemic D,L-lactide comprises a 1/1 mixture of D-, and L-lactide).

The preparation of polyesters and copolyesters is well known in the art, such as disclosed in U.S. Pat. No. 2,012,267. Such reactions are typically operated at temperatures from 150° C. to 300° C. in the presence of polycondensation catalysts such as titanium isopropoxide, manganese diacetate, antimony oxide, dibutyl tin diacetate, zinc chloride, or combinations thereof. The catalysts are typically employed in amounts between 10 to 1000 parts per million (ppm), based on total weight of the reactants (cf. U.S. Pat. No. 6,020,393).

In addition to the Poly(lactic acid) and the copolyester of adipic acid, the composition is compounded with nanoparticles of a mineral material selected from the group of silica and magnesium silicate. Nanoparticles according to the invention define particles having a size definitely lower than the common size of current ground mineral equivalents which are usually of the order of several microns; according to the present invention the nanoparticles have a size comprised between about 20 and a maximum of 500 nanometers; good performance can be achieved with a mineral material the nanoparticles of which have an average particle size of the order of 200 to 400, e.g. of about 250 nanometers.

Although size particle is a critical parameter to achieve the desired performance, the extremely high degree of purity of the mineral selected therefore is crucial. Best results are achieved by using nanoparticles of at least 99.9%, preferably 99.99% pure silica or magnesium silicate. Special qualities of finely ground silica as provided by the specialized trade have been proved suitable within the frame of the present invention.

The biodegradable polymer can further comprise between 1 and 32% by weight of mineral particles, each on the basis of the total weight of the biodegradable composition, said mineral particles comprising at least one of magnesium and silicate. Examples for such minerals are e.g. montmorillonite or talc. The mineral act as filler adds strength and imparts stiffness. Usually, the mineral particles have a size of 0.2 to 4.0 microns, more frequently a size of 1 to 2 microns.

Moreover, during the preparation of a biodegradable polymer according to the present invention organic peroxide may be added to the reaction mixture in an amount of less than 5% by weight, on the basis of the total weight of the biodegradable final polymer composition.

Examples for organic peroxides which may be used for preparing a composition according to the present invention are e.g. diacetyl peroxide, cumyl-hydroperoxide, and dibenzoyl peroxide. Other organic peroxides known to a skilled person may be used as well. The organic peroxides serve as radical starter molecules initiating a polymerization and help to provide connections, in particular covalent bonds, between the components present in a composition according to the present invention.

Depending on the specific applications desired, a biodegradable polymer composition of the present invention may also comprise additional additives or components well known in the art, namely biodegradable components or additives such as e.g. natural coloring agents, additional polymeric compounds like starch, processed starch, cellulose, cellulose fibers, proteins, protein fibers, etc.

A composition of the present invention may be used for the production of various articles, such as e.g. molded articles and/or extruded articles. The term "molded article" (or "extruded article") as used in the present invention comprises articles made according to a molding process (or an extrusion process). A "molded article" (or "extruded article") can also be part of another object, such as e.g. an insert in a container or a knife blade or fork insert in a corresponding handle.

The figures here below are provided for exemplification only and they can be modified by the skilled artisan to the necessary extent, depending on the special features which are looked for.

A molded article according to the present invention comprises a biodegradable composition, which biodegradable composition comprises between 40 and 97%, e.g. about 91% by weight of poly(lactic acid) polymer, and between 0.5 and 35%, e.g. 5% by weight of co-polyester polymer with adipic acid, and about 4% of at least 99.9%, preferably 99.99% pure finely ground silica, each on the basis of the total weight of the biodegradable composition.

According to another embodiment of the invention the molded article comprises a biodegradable composition, which biodegradable composition comprises e.g. about 75% by weight of poly(lactic acid) polymer, e.g. 5% by weight of co-polyester polymer with adipic acid, e.g. about 15% of mineral particles of magnesium silicate or talc, and about 5% of at least 99.9%, preferably 99.99% pure finely ground silica, each on the basis of the total weight of the biodegradable composition. Examples for various molded article are utensils, forks, spoons, knives, chopsticks, containers and cups.

An extruded article according to the present invention comprises a biodegradable composition, which biodegradable composition comprises between 40 and 97% by weight of poly(lactic acid) polymer, and between 0.5 and 35% by weight of co-polyester polymer with adipic acid, each on the basis of the total weight of the biodegradable composition. In particular, a biodegradable composition for an extruded article according to the present invention can comprise between 50 and 85%, e.g. 75% by weight of poly(lactic acid) polymer, between 2 and 20%, e.g. 15% by weight of co-polyester polymer with adipic acid and about 5% of at least 99.9%, preferably 99.99% pure finely ground silica, each on the basis of the total weight of the biodegradable composition. Extruded articles may be for example films, trash bags, grocery bags, container sealing films, pipes, drinking straws, spun-bonded non-woven materials, and sheets.

A formulation for a profile extrusion process on the basis of a composition according to the present invention can comprise e.g. 75% by weight of poly(lactic acid) polymer, about 15% by weight of co-polyester polymer with adipic acid, and about 5% of at least 99.9%, preferably 99.99% pure finely ground silica, each on the basis of the total weight of the biodegradable composition. Articles according to the present invention made from a profile extrusion formulation are for example drinking straws and pipes.

A formulation for a thermoform extrusion process on the basis of a composition according to the present invention can comprise between 75% and 85% by weight of poly(lactic acid) polymer, between 5% and 15% by weight of co-polyester polymer with adipic acid, between 5% and 15% by weight of mineral particles comprising at least one element selected from the group consisting of magnesium and silicate, preferably about 75% by weight of poly(lactic acid) polymer, about 15% by weight of co-polyester polymer with adipic acid, about 9% by weight of magnesium silicate or talc, and about 5% of at least 99.9%, preferably 99.99% pure finely ground silica.

Articles according to the present invention made from a thermoform extrusion method are e.g. sheets for producing cups, plates and other objects, which could be outside of the food service industry.

As outlined in detail before, the composition for the preparation of such molded articles can comprise in addition to the above-mentioned components organic peroxide(s), mono ester(s), and/or natural plasticizer(s).

Injection molding, profile extrusion and thermoform extrusion are processes known to a skilled person and are described for example in Modern Plastics Encyclopedia, Published by McGraw-Hill, Inc.—mid-October 1991 edition.

The present invention will be described now in detail on the basis of the following non-limiting examples given by way of an example only.

Example 1

Injection Molding Formulations

Several injection molding formulations have been using the following ingredients in proportions varying within the ranges provided here below:
 from 75% to 91% by weight poly(lactic acid) polymer
 from 2% to 5% by weight (co-polyester polymer with adipic acid)
 from 0.2% to 4% by weight of finely ground 99.99% pure silica**.
(** average size particle of about 250 nanometers)

It is crucial that introducing the mineral nanoparticles be performed without creating aggregates, using for instance a side-feeder that would not inject the nanoparticles directly into the barrel of the extruder but through a tower letting the nanoparticles fall and mix smoothly with the molten material.

The above-mentioned compounds are mixed by means of extrusion compounding at a temperature not to exceed 160° C. over a period ranging from 25 sec to 2 min. Then, the resulting mixture is filled in an injection molding device at a temperature of about 160° C. and is injected into a mold at a temperature of about 20° C. in order to obtain an injection molded cup.

Example 2

Injection Molding Formulation (Specific)

An injection molding formulation is prepared which comprises:
 74.5% by weight poly(lactic acid) polymer
 5% by weight (co-polyester polymer with adipic acid)
 15% by weight of magnesium silicate (talc)
 5% by weight of finely ground 99.99% pure silica**, and
 0.5% by weight of 2,5-Dimethyl-2,5-di(t-butyl peroxy) hexane.
(** average size particle of about 250 nanometers)

The injection molding formulation is prepared as detailed in Example 1 and injection molded products may be obtained according to the steps lined out in said Example 1.

The above formulations are provided for exemplification only and they can be modified by the skilled artisan to the necessary extent, depending on the special features which are looked for.

Example 3

Profile Extrusion Formulation

Several profile extrusion formulations have been using the following ingredients in proportions varying within the ranges provided here below:
 from 65% to 75% by weight poly lactic acid polymer
 from 15% to 20% by weight of co-polyester polymer with adipic acid, and
 from 1% to 5% by weight finely ground 9.99% pure silica**.
(**average size particle of about 250 nanometers)

The above-mentioned compounds are mixed by twin screw compounding. The resulting mixture is filled in a profile extrusion device at a temperature not to exceed 160° C. and a tube is obtained which may be used as a drinking straw.

The above formulations are provided for exemplification only and they can be modified by the skilled artisan to the necessary extent, depending on the special features which are looked for.

Example 4

Thermoform Extrusion Formulation

Several thermo form extrusion formulations have been using the following ingredients in proportions varying within the ranges provided here below:
 from 55% to 75% by weight poly lactic acid polymer
 from 5% to 15% by weight of co-polyester polymer with adipic acid
 from 4% to 9% by weight of magnesium silicate (talc)
 from 1% to 5% by weight finely ground 99.99% pure silica**, and
 from 0.2% to 1% by weight of 2,5-Dimethyl-2,5-di(t-butyl peroxy) hexane.
(**average size particle of about 250 nanometers)

The above-mentioned compounds are mixed by twin screw compounding. The resulting mixture is filled in a thermoform extrusion device at a temperature not to exceed 160° C. and a sheet having a thickness between 0.1 mm to 45 mm is obtained which may be used for forming cups, plates or bottles.

The above formulations are provided for exemplification only and they can be modified by the skilled artisan to the necessary extent, depending on the special features which are looked for.

Numerous modifications and variations of the present invention are possible in light of the above teachings. It is therefore to be understood that within the scope of the appended claims, the invention may be practiced otherwise than as specifically described herein.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A biodegradable polymer composition for the preparation of items that may be in contact with food material, comprising as starting materials:
 an organic peroxide in an amount more than 0 and up to 5% by weight, wherein said organic peroxide is selected from the group consisting of diacetyl peroxide, cumyl-hydro-peroxide, dibenzoyl peroxide, dialkyl peroxide, 2,5-methyl-2,5-di(terbutylperoxy)-hexane and mixtures thereof;
 between 40 and 97% by weight of poly(lactic acid) polymer;
 between 0.5 and 35% by weight of a co-polyester polymer with adipic acid; and
 nanoparticles in an amount more than 0 and up to 6% by weight and having an average particle size ranging between about 20 and about 500 nanometers, the nanoparticles having a degree of purity of at least 99.9% and being selected from the group consisting of silica and magnesium silicate, each on the basis of the total weight of the biodegradable polymer composition.

2. The biodegradable polymer composition according to claim 1 further comprising between 1 and 32% of particles of mineral filler comprising montmorillonite or talc having a particle size comprised between about 1 and about 2 microns.

3. The biodegradable polymer composition of claim 1 wherein the degree of purity is 99.99%.

4. A molded, extruded or thermoformed article comprising a biodegradable composition, said biodegradable composition comprising as starting materials:
   an organic peroxide in an amount more than 0 and up to 5% by weight, wherein said organic peroxide is selected from the group consisting of diacetyl peroxide, cumyl-hydro-peroxide, dibenzoyl peroxide, dialkyl peroxide, 2,5-methyl-2,5-di(terbutylperoxy)-hexane and mixtures thereof,
   between 40 and 97% by weight of poly(lactic acid) polymer,
   between 0.5 and 35% by weight of co-polyester polymer with adipic acid, and
   nanoparticles in an amount more than 0 and up to 6% by weight and having an average particle size ranging between about 20 and about 500 nanometers, the nanoparticles having a degree of purity of at least 99.9% and being selected from the group consisting of silica and magnesium silicate, each on the basis of the total weight of the biodegradable polymer composition.

5. The article according to claim 4, said article being selected from the group consisting of utensils, food serviceware, forks, spoons, knives, chopsticks, containers, cups, plates and pots.

6. The article according to claim 4, which further comprises particles of mineral filler comprising montmorillonite or talc having a particle size comprised between about 1 and about 2 microns.

7. The article according to claim 4, to which composition during its preparation an organic peroxide in an amount more than 0 and up to 5%, on the basis of the total weight of the biodegradable composition, has been added.

8. The article of claim 4 wherein the degree of purity is 99.99%.

9. A method of producing an article comprising a biodegradable composition, said process comprising the steps of:
   (i) providing a biodegradable composition comprising an organic peroxide in an amount more than 0 and us to 5% by weight wherein said organic peroxide is selected from the group consisting of diacetyl peroxide, cumyl-hydro-peroxide, dibenzoyl peroxide, dialkyl peroxide, 2,5-methyl-2,5-di(terbutylperoxy)-hexane and mixtures thereof, between 40 and 97% by weight of poly(lactic acid) polymer, and between 0.5 and 35% by weight of co-polyester polymer with adipic acid, each on the basis of the total weight of the biodegradable composition, and nanoparticles in an amount more than 0 and up to about 6% by weight and having an average particle size ranging between about 20 and about 500 nanometers, the nanoparticles having a degree of purity of at least 99.9% and being selected from the group consisting of silica and magnesium silicate;
   (ii) mixing the constituents of (i) so as to prevent the creation of aggregates;
   (iii) heating the mixture to a temperature of from 95 to 135° C.; and
   (iv) forming the resultant mixture to obtain a desired shape.

10. The method of claim 9, wherein the mineral nanoparticles are introduced into the barrel of the mixer/extruder through a side feeder.

11. The method of claim 9 which comprises adding to the biodegradable composition provided according to step i) between 1 and 32% of particles of mineral filler comprising montmorillonite or talc having a particle size comprised between about 1 and about 2 microns.

12. The method of claim 9, wherein the step of forming includes subjecting said biodegradable composition to a process selected from the group consisting of injection molding, profile extrusion, and thermoform extrusion.

13. The method of claim 9 wherein the degree of purity is 99.99%.

* * * * *

UNITED STATES PATENT AND TRADEMARK OFFICE
CERTIFICATE OF CORRECTION

PATENT NO. : 7,927,532 B2  
APPLICATION NO. : 11/365579  
DATED : April 19, 2011  
INVENTOR(S) : Frederic Scheer Page 1 of 1

It is certified that error appears in the above-identified patent and that said Letters Patent is hereby corrected as shown below:

Column 10, Claim 9, line 8, "more than 0 and us to 5%" should be "more than 0 and up to 5%".

Signed and Sealed this  
Twentieth Day of September, 2011

David J. Kappos  
*Director of the United States Patent and Trademark Office*